United States Patent [19]

Samuels et al.

[11] 4,091,238
[45] May 23, 1978

[54] AUTOMATIC TELEPHONE CALL COMPUTER AND DISPLAY

[75] Inventors: Ira Samuels, Metuchen; Sidney Barzman, Tenafly, both of N.J.

[73] Assignee: Beacon Computer Corp., Metuchen, N.J.

[21] Appl. No.: 749,516

[22] Filed: Dec. 10, 1976

[51] Int. Cl.² ........................................... H04M 15/12
[52] U.S. Cl. ................................................. 179/7.1 R
[58] Field of Search ............... 179/7 R, 7 MM, 7.1 R, 179/7.1 TP, 8 R, 8 A, 2 TC, 6.3 R; 235/184, 185, 91 E, 92 TE

[56] References Cited

U.S. PATENT DOCUMENTS

| | | | |
|---|---|---|---|
| 3,573,378 | 4/1971 | Leyburn et al. | 179/7.1 R |
| 3,590,161 | 6/1971 | Jacobs | 179/7.1 R |
| 3,769,463 | 10/1973 | Graham et al. | 179/7.1 TP |
| 3,934,240 | 1/1976 | Norling | 179/7.1 R |
| 3,982,073 | 9/1976 | Baltzer et al. | 179/7.1 TP |

Primary Examiner—Kathleen H. Claffy
Assistant Examiner—Gerald L. Brigance
Attorney, Agent, or Firm—Lerner, David, Littenberg & Samuel

[57] ABSTRACT

Equipment for calculating and displaying the cost of a telephone call while it is in progress is disclosed which includes circuitry for defining the relative location of the caller and the person being called, determining the initial and overtime intervals for such call and determining the rate structure for such call.

10 Claims, 9 Drawing Figures

AUTOMATIC TELEPHONE CALL COMPUTER AND DISPLAY

FIELD OF THE INVENTION

This invention relates to equipment for calculating and displaying the cost of telephone calls and particularly to automatic systems which minimize the need for user intervention.

BACKGROUND OF THE INVENTION

U.S. Pat. No. 3,769,463, which issued Oct. 30, 1973, to Philip G. Graham et al. and is entitled "Electronic Long-Distance Telephone Call Computer and Recorder", shows a system for automatically computing and recording the cost of a long distance telephone call which is not fully automated and requires that the user set both the initial and overtime rate for the call in two separate registers. Thus, it is necessary for the user to know both the initial and overtime rate for every call he is to make and manually set the same into the unit in order for the Graham et al. unit to record and display the cost of the call. The Graham device is not suitable as a consumer device since the amount and format of information to be set into the unit is beyond that which the normal consumer would be willing to do for a device of this nature.

U.S. Pat. No. 3,970,793, which issued July 20, 1976, to Leslie M. Profitt et al. and is entitled "Telephone Call Toll Monitor and Indicator", again attempts to provide a unit for monitoring telephone calls. The Profitt device can be used only for long distance calls. This is true because Profitt uses a mechanical clutch for setting telephone rates. This clutch is not suitable for calculating rates in certain areas of the country where message unit areas and intrastate rates apply.

The above devices are attempts at solving the problem of providing a unit for automatically displaying to the user of a telephone the cost of the call while it is in process. Such units have not been developed which are fully automated for several reasons. First, the rate structure around the country varies in a non-linear fashion both for initial charges and for overtime rates. Basically, there are three types of telephone calls, i.e. local calls, intrastate calls, and interstate calls. In many metropolitan areas, the local calls are divided into a maximum of seven message unit areas. Normally, these local rate structures are only in effect in the large metropolitan areas such as New York. The method of billing varies from metropolitan area to metropolitan area and within the various message unit areas. For example, it may be that in a first zone there is no charge for calls (i.e. unlimited calling) and in a second zone there may be a fixed charge for each call while in further zones there may be an initial charge and an incremental charge based upon different time intervals and different rates per unit time depending upon distance.

The telephone rates also vary depending upon whether or not a call is made in the day, evening, or night.

Therefore, it is an object of this invention to provide a new and useful device for indicating the rates of a telephone call.

It is another object of this invention to provide a device which indicates the imminent increase in the accrued cost of a telephone call to allow the user to end the call before the increased cost is incurred.

It is a further object of this invention to provide an apparatus for calculating and displaying the accrued cost of a telephone call in which simple controls operate the same.

It is still a further object of this invention to provide an apparatus for calculating and displaying the accrued cost of a telephone call in which message unit areas, intrastate areas, and interstate areas can be accommodated with the setting of a single slide device.

BRIEF DESCRIPTION OF THE INVENTION

With these and other objects in view, the present invention contemplates an apparatus which calculates and displays the accrued cost of a telephone call in which a slide pot and comparator are employed for providing a coded signal indicative of the relative locations of a calling party and a called party, a non-linear digital to analog converter converts the coded signal to an analog signal provides a pulse train related to the analog signal, a counter receives the pulse train, and the count therein is displayed to provide the accrued cost of the telephone call.

In the preferred embodiment the above structure is employed to calculate and display the accrued cost of a telephone call in a message unit area while an analog signal is employed to calculate and display the accrued cost of a telephone call in the interstate and intrastate areas.

DESCRIPTION OF THE DRAWINGS

For a more complete understanding of the invention, reference should be made to the detailed description and drawings in which.

DETAILED DESCRIPTION OF THE DRAWINGS

A. MODE SELECTION

Figure 1:
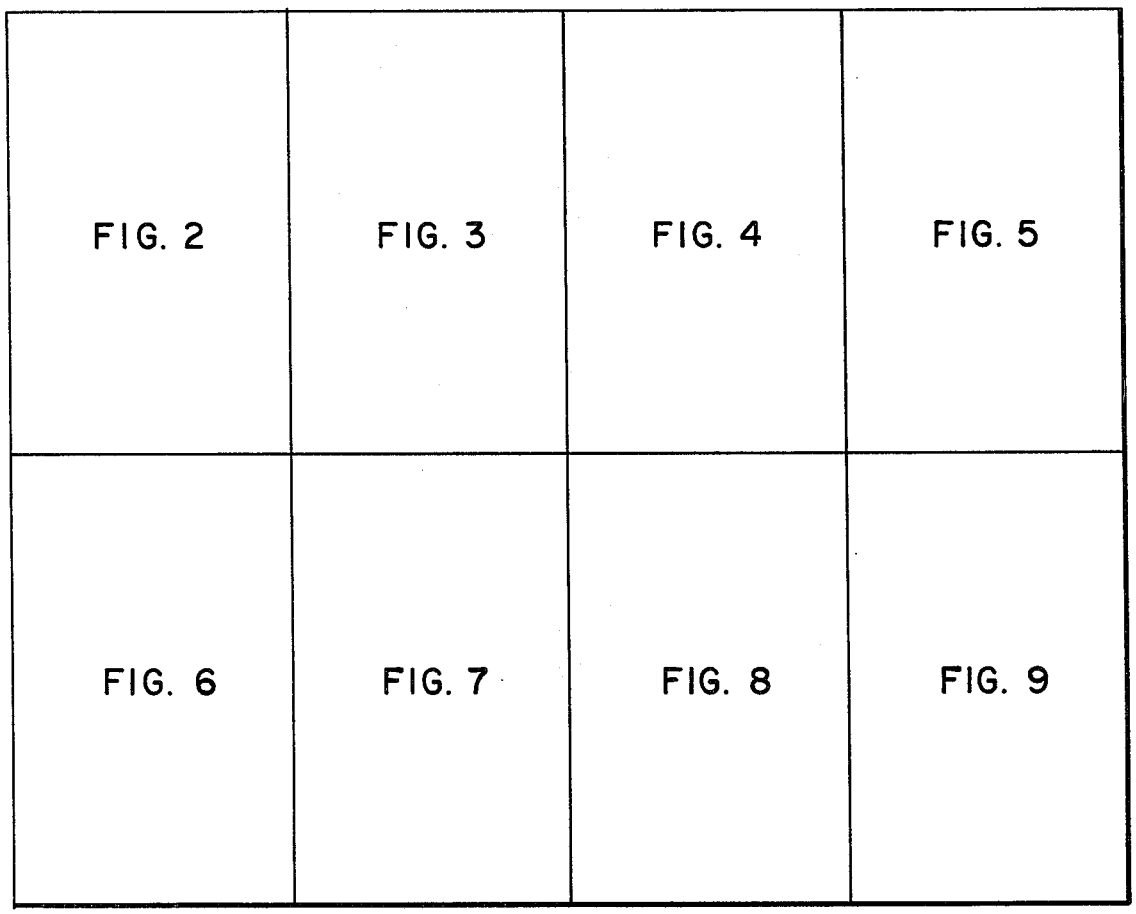
FIG. 1 is a composite view showing the arrangement of the other figures to make a complete circuit diagram of the unit which is the basis of this invention.
Figure 2:
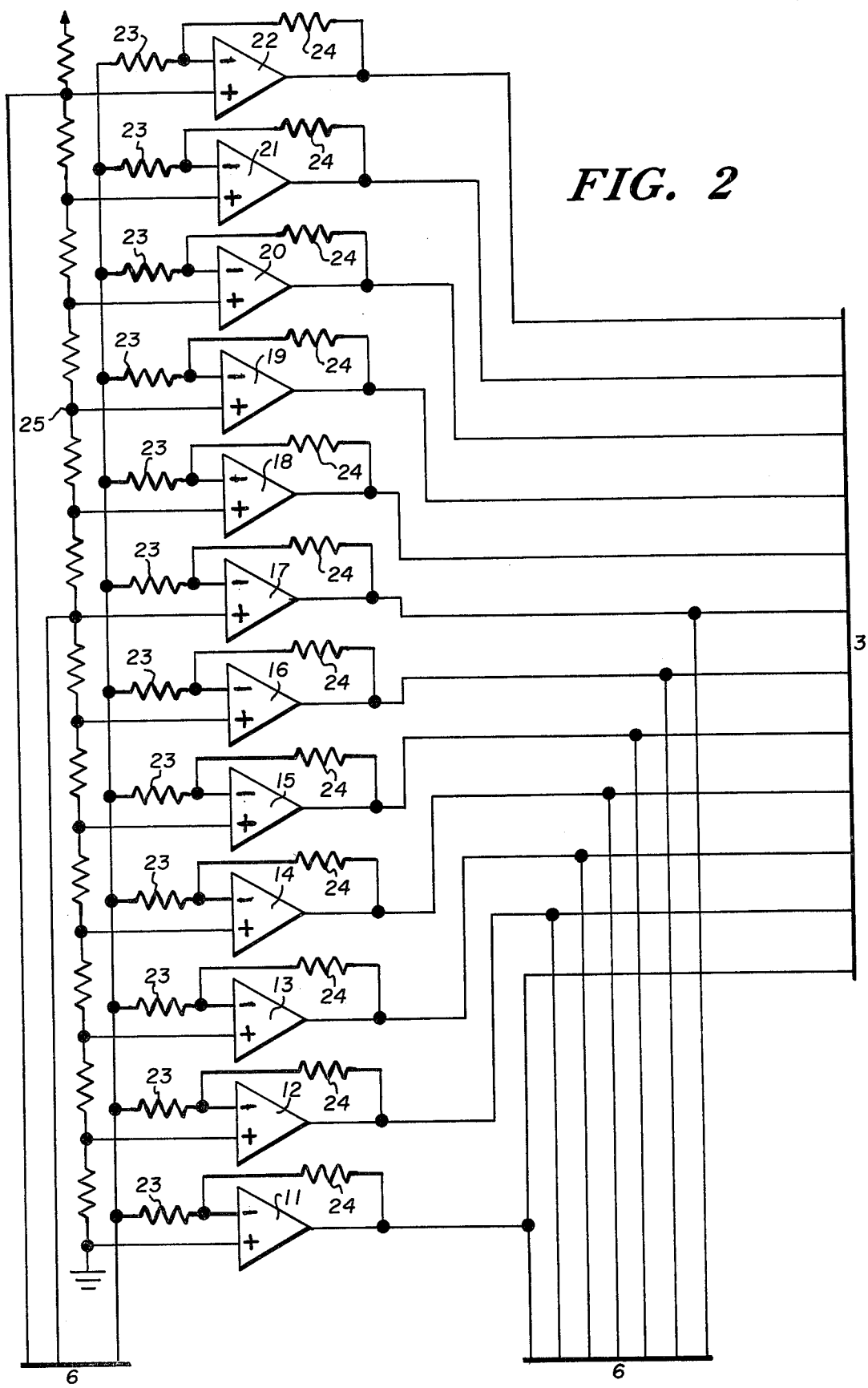
FIGS. 2 through 9 are portions of a schematic circuit diagram which when put together as shown in FIG. 1 form the complete circuit diagram of the unit, which is the basis of this invention.
Figure 3:
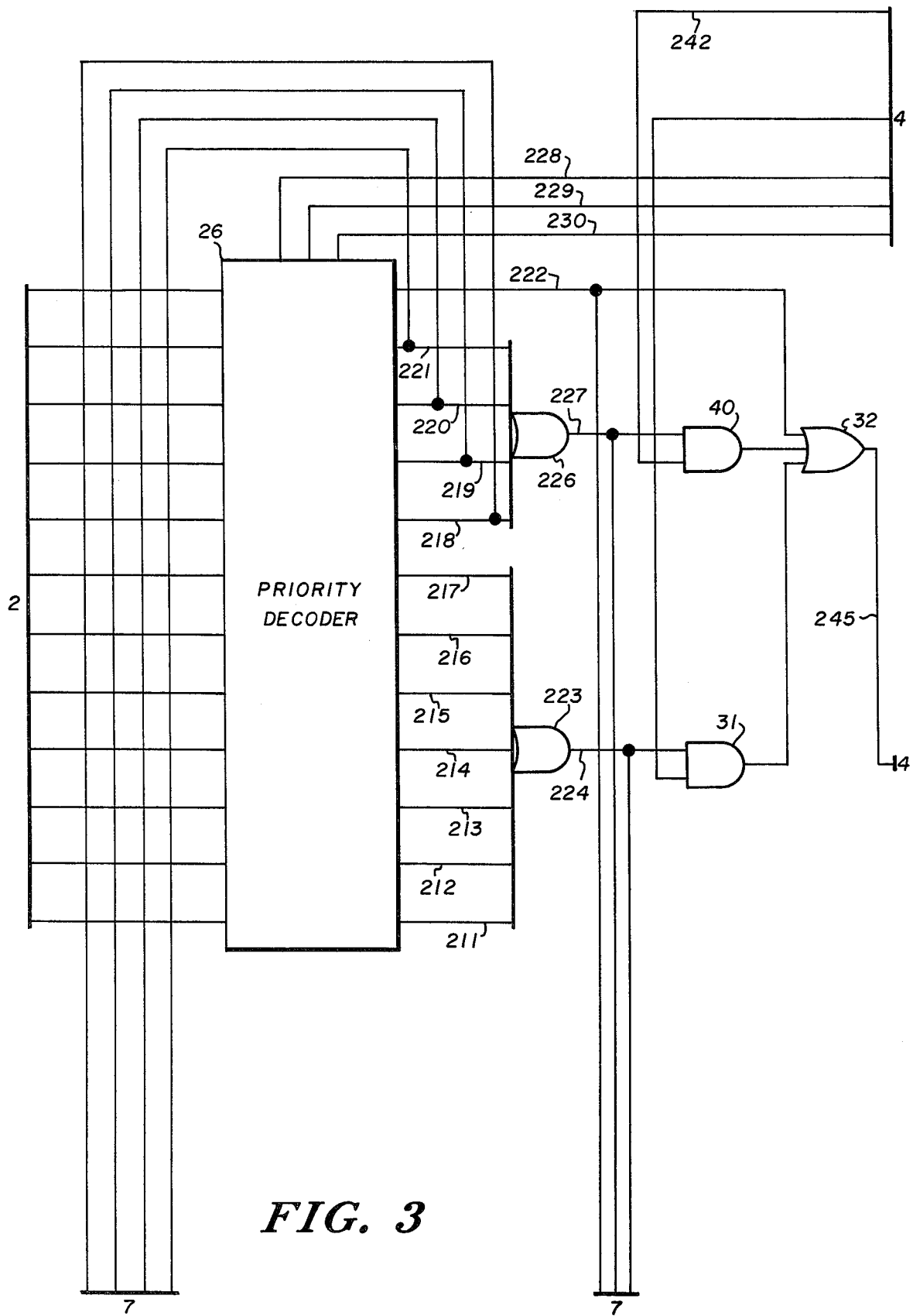
Figure 4:
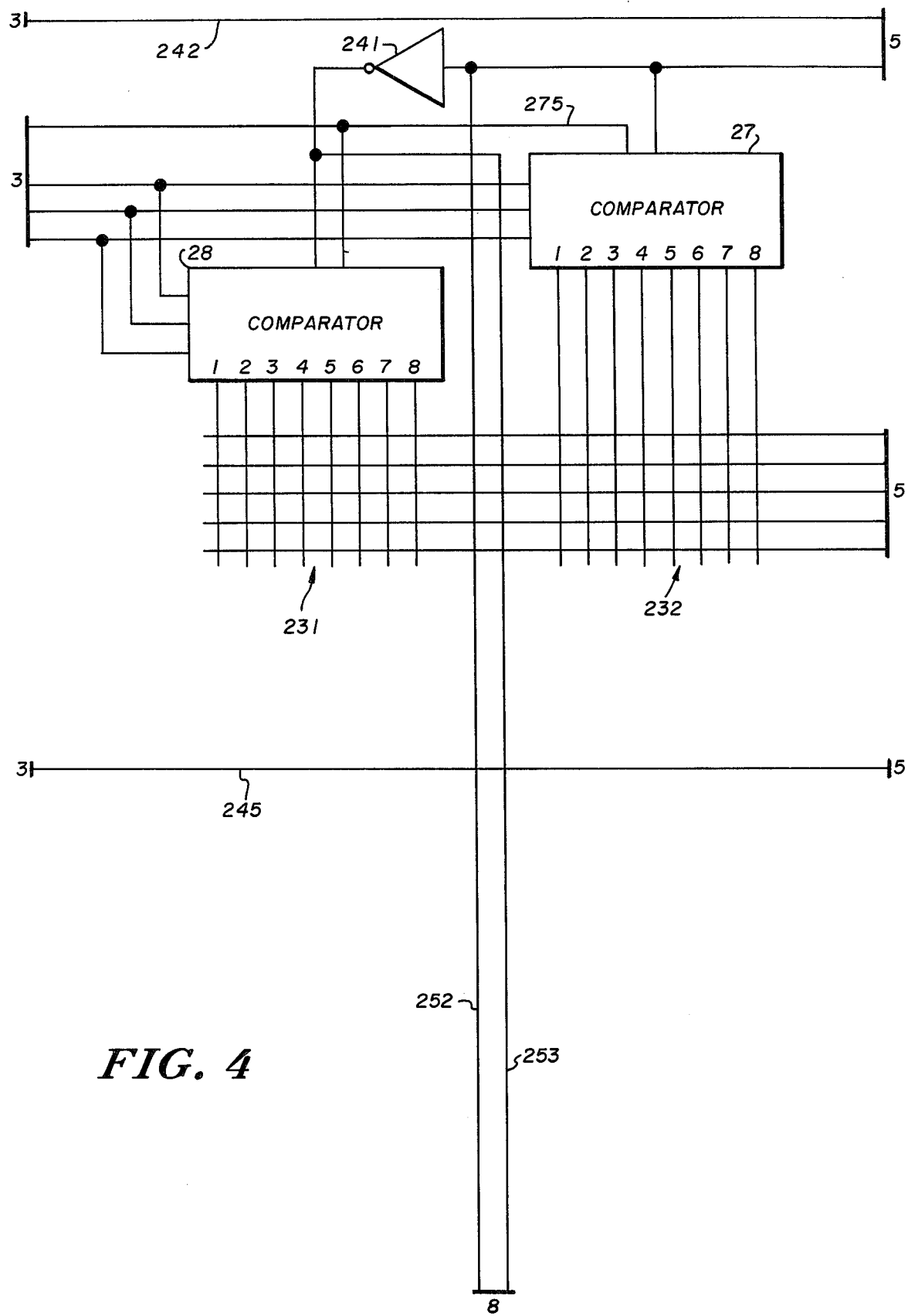
Figure 5:
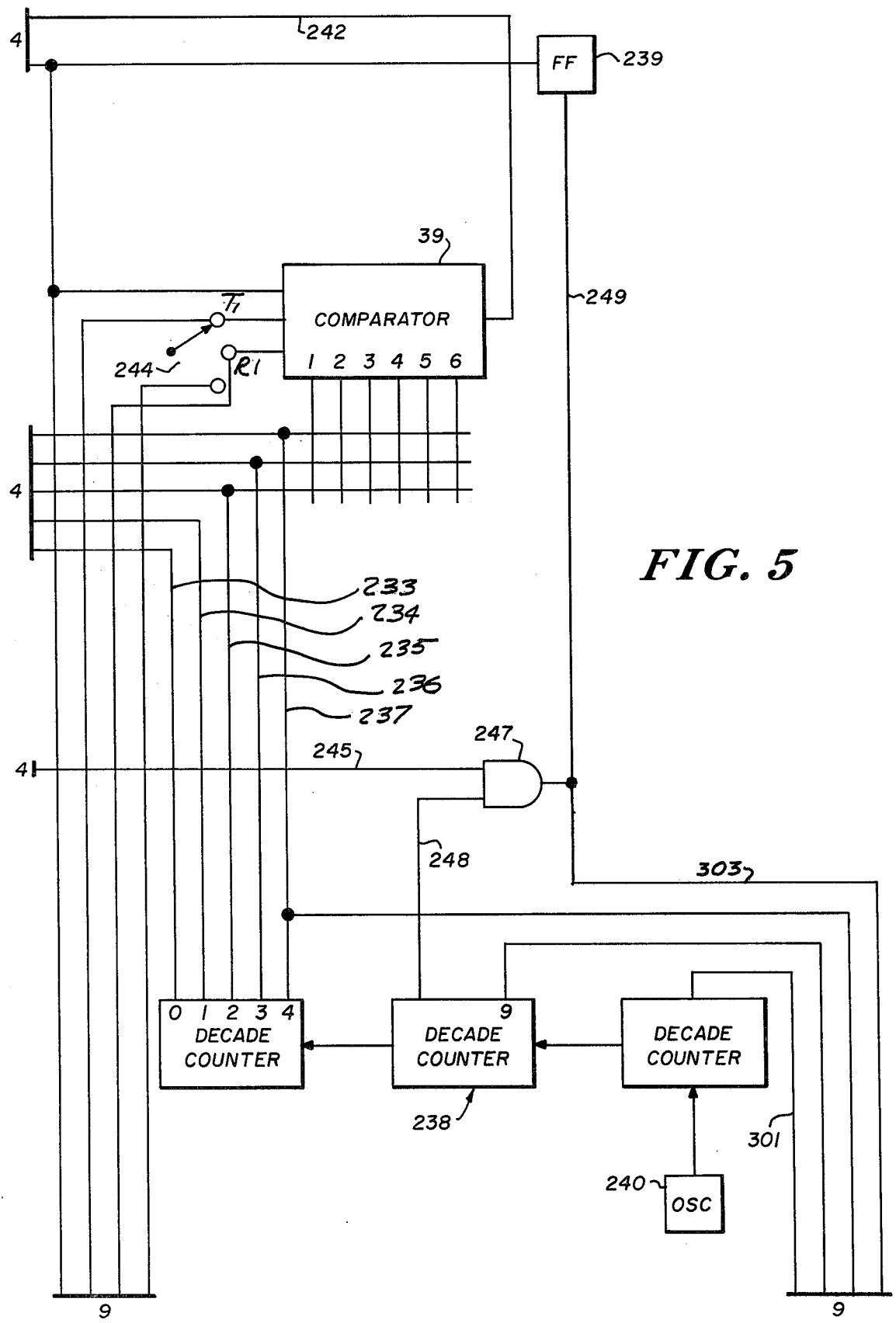
Figure 6:
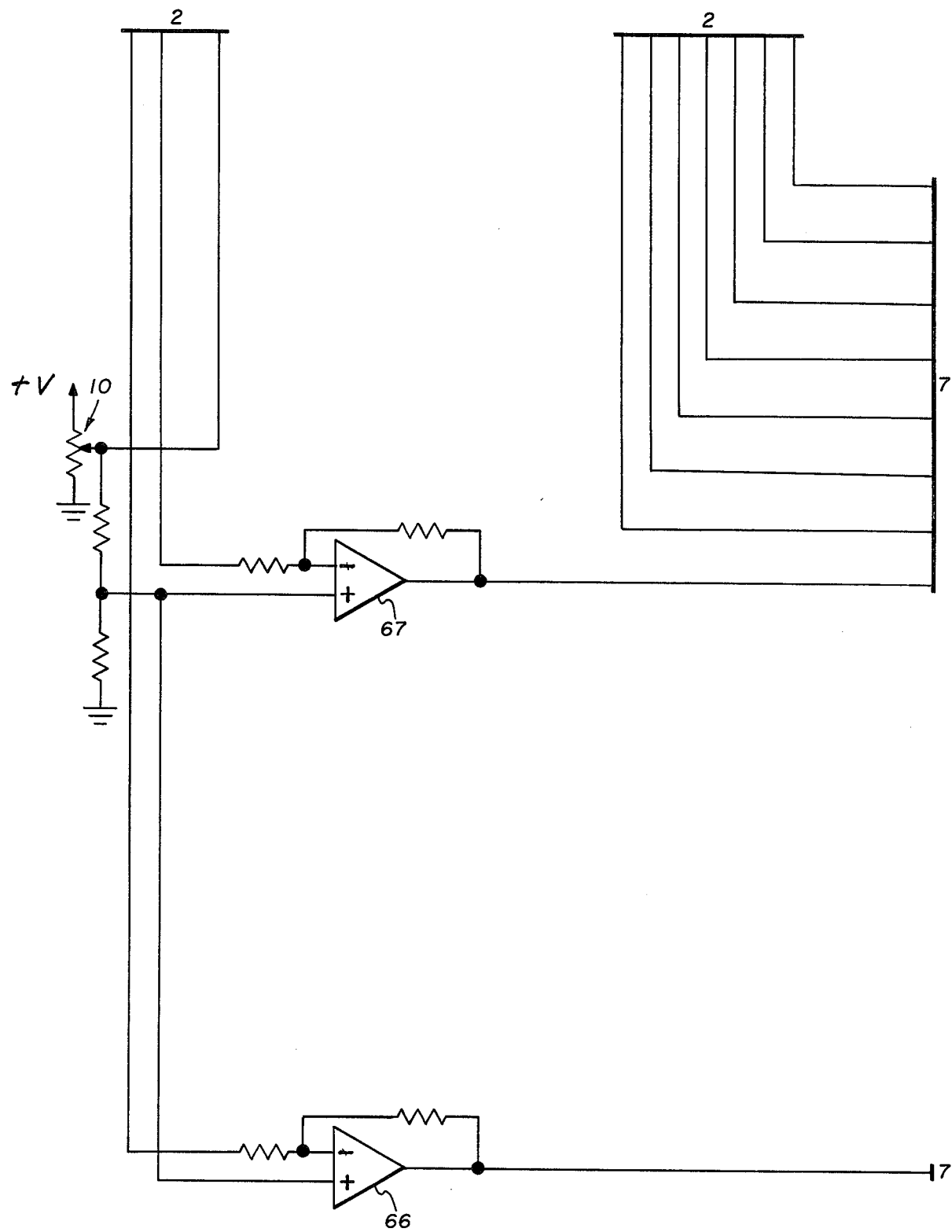
Figure 7:
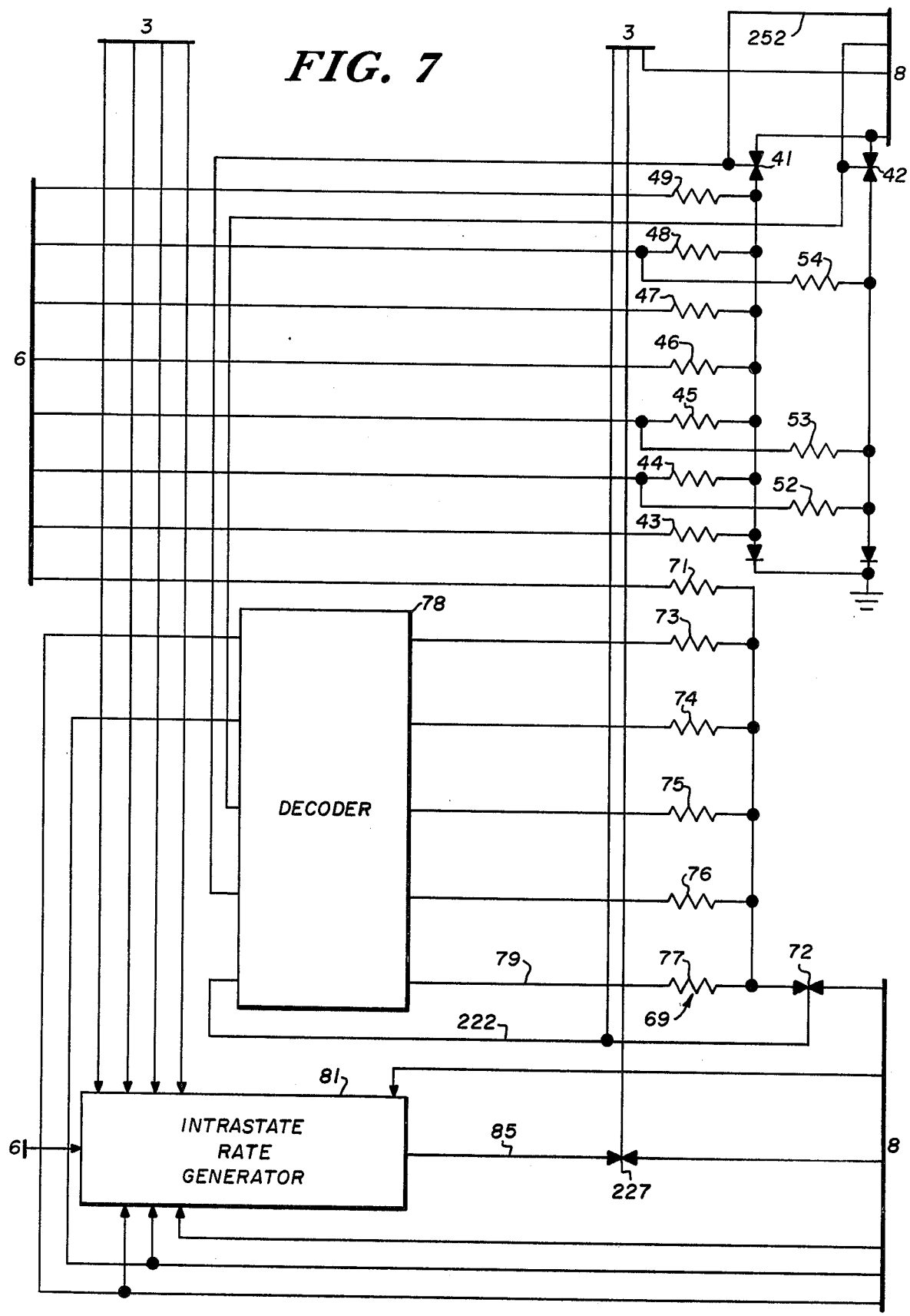
Figure 8:
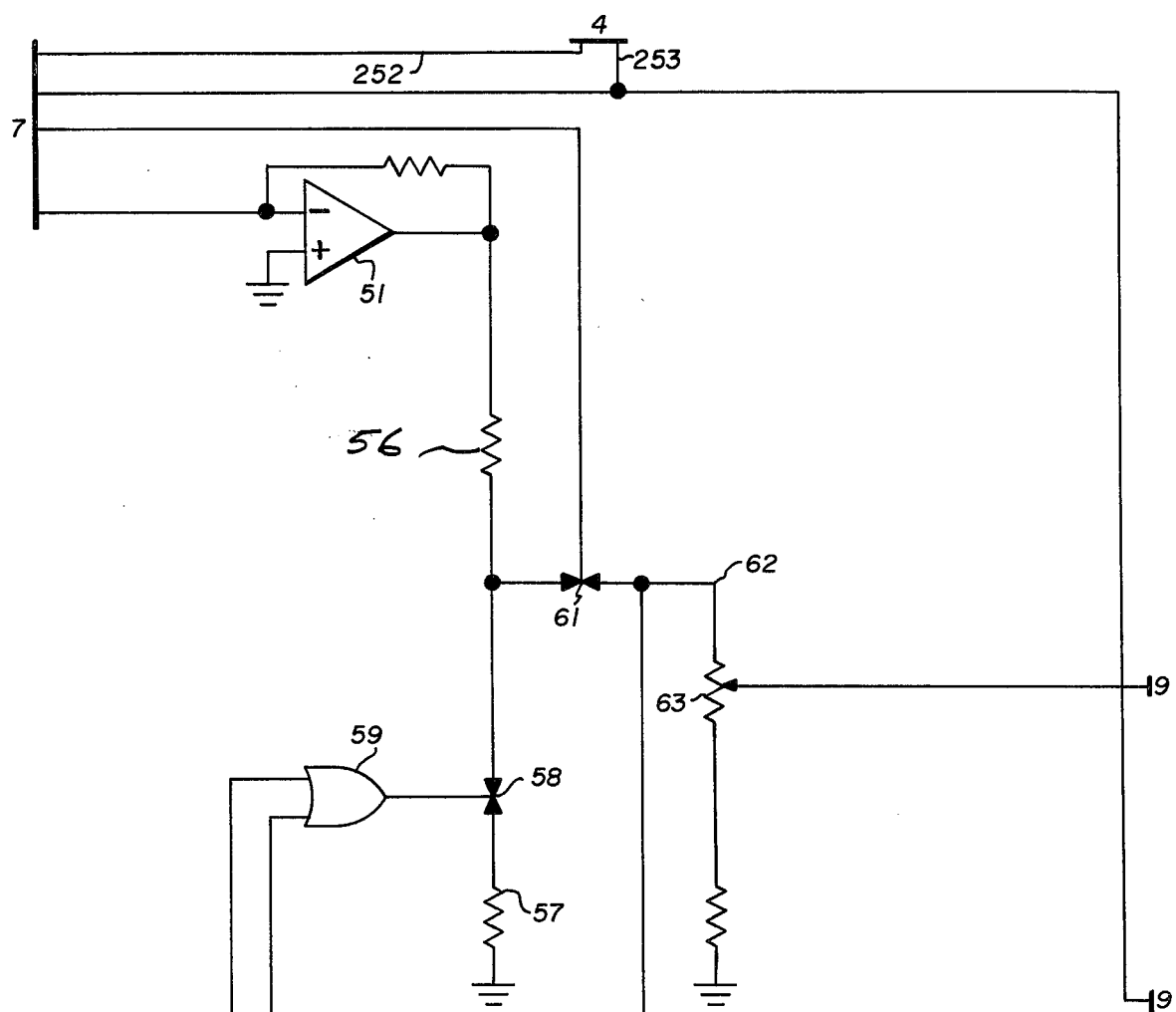
Figure 8:
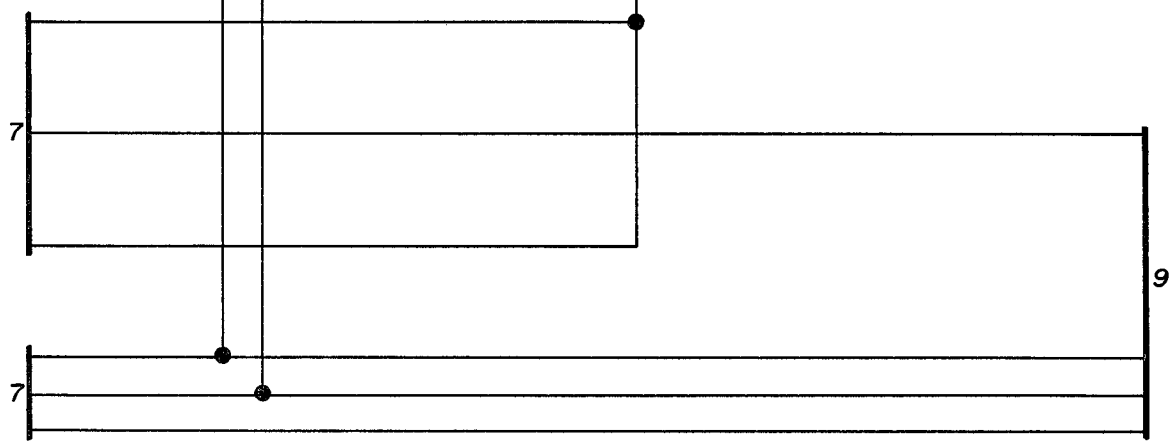
Figure 9:
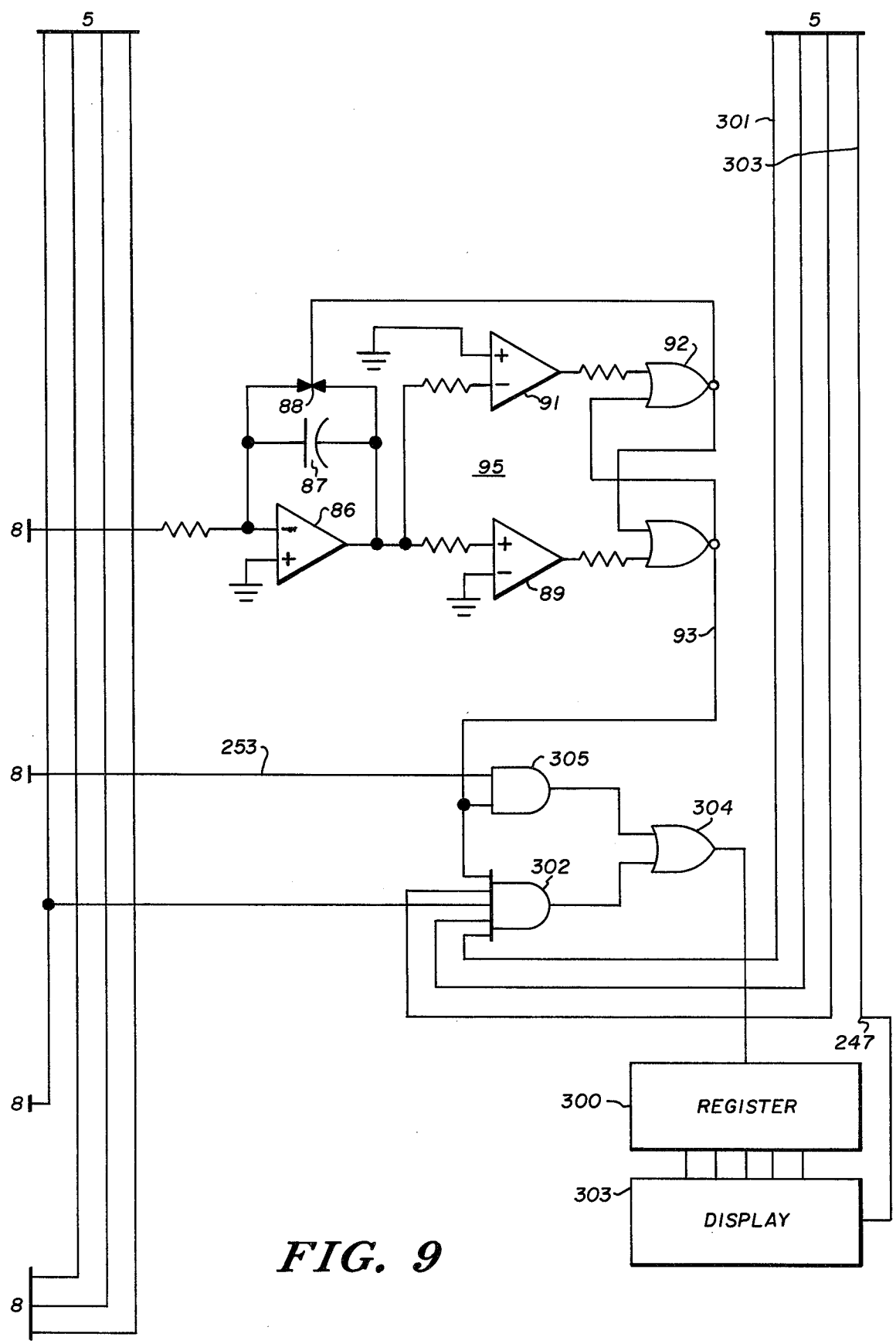

Referring now to FIG. 1, we see a schematic of a circuit diagram for a circuit which operates a unit for monitoring and displaying the cost of telephone calls constructed in accordance with the invention. In the circuit, a slide pot 10 sets the mode (times and rates) in which the unit is to operate. In the unit, there is a pointer (not shown) associated with the slide pot 10 adjacent to a scale (not shown) having indications thereon relative to message unit areas, intrastate areas and interstate area calls so that the modes of the unit are associated with the areas between which calls are being made. In operation the unit is supplied with maps for the locality in which it is to be used so that a user can initially determine the proper area number into which he is calling for a particular telephone number. It is contemplated that a user will put the area number information into his telephone directory so that in making future calls the area information will be available, and no further reference to the maps will be necessary.

The slide pot 10 is connected between a source of voltage plus V and ground to function as both a switch and an analog voltage source. The arm of the slide pot 10 is connected as an input to a plurality of level sensing circuits 11 through 22. Each of the level sensing circuits 11 through 22 include a differential amplifier in which the slide pot signal is fed thereto through a resistor 23 to its non-inverting input.

The inverting inputs of each of the differential amplifiers are connected to reference voltage levels established by a voltage divider chain 25. Each of the level sensing circuits 11 through 22 has a resistor 24 connected from its output back to the non-inverting input to provide hysteresis so that the level sensing circuits 11 through 22 will not oscillate about the reference voltage levels established by the voltage divider chain 25.

In operation when the slide pot 10 is set to a particular voltage, all of the differential amplifiers, which are referenced to reference voltage levels by the voltage divider 25 which are lower than the voltage supplied by the slide pot 10, will be in a first actuated stated and those which are referenced to a higher voltage are in a second deactuated state. In this way, the combination of the level sensing circuits 11 through 22 including the differential amplifiers and the voltage divider 25, together with the slide pot, provide a digital signal on the output of the level sensing circuits 11 through 22 indicative of the position of the slide pot 10. Therefore, it can be seen that using this technique a multiple switching function is performed with a single movable element (the slide pot 10) having a continuous adjustment rather than discrete positions as with normal switching. Further, an analog voltage is supplied by the slide pot 10 itself for further processing.

The outputs from the level sensing circuits 11 through 22 drive a priority decoder 26 which provides a coded output on leads 211 through 222 indicating which level sensor 11 through 22 was turned on last. The leads 211 through 217 are fed to an OR circuit 223 to provide a signal on a lead 224 which indicates that one of the seven level sensing circuits 11 through 17 was the last to be turned on. This signal on the lead 224 provides an indication that the user has set the unit to one of the seven permissible message unit areas. In a like fashion, an OR gate 226 is driven by the leads 218 through 221 to provide a signal on its output lead 227 indicating that the user has set the slide pot 10 to one of the intrastate areas. A signal appearing on the lead 222 is indicative that the user has set the slide pot to indicate that an interstate call is being made. In this way, signals are provided on leads 222, 227, and 224 segregating calls being made into the three major classes of telephone calls possible (i.e. interstate, intrastate and message unit area calls). These signals are employed to select circuit subgroups for setting initial and overtime periods and calculating actual call charges.

It should be noted that by using a logical signal (not shown) indicating that none of the comparators are actuated, a further function can be selected. For example, such a signal could be used to display elapsed time of a call.

B. INITIAL AND OVERTIME INTERVAL DETERMINATION

The priority decoder 26 also provides a digital signal on three leads 228, 229, and 230 which is a binary representation of the states of the signals on the leads 211 through 217. In other words, a binary signal is provided on the leads 228, 229, and 230 indicative of the particular one of the message unit areas selected.

This binary signal on the leads 228, 229, and 230 is fed to a pair of digital comparators 27 and 28. A second set of input terminals 1 through 8 are provided on each of the comparators 27 and 28. If the comparator 27 or 28 is actuated and the binary code on the leads 228, 229 and 230 represents one of the terminals 1 through 8, that terminal is connected to the lead 275. A pair of selectively wired memory devices 231 and 232 which are specifically wired for each unit built depending upon the local usage thereof selectively connects leads 233 through 237 to terminals 1 through 8. These memory devices 231 and 232 are employed to enable the overall device to select the proper initial and overtime time intervals for telephone calls being monitored. The plurality of leads 233 through 237 connects a counter chain 238 to the memory devices 231 and 232. The timing chain 238 is driven by a clock 240 which provides a pulse once every 1/100 of a minute. The timing chain 238 is capable, if not reset, of providing a pulse during the first minute after last being reset on the lead 233, during the second minute on the lead 234, during the third minute on the lead 235, during the fourth minute on the lead 236, and during the fifth minute on the lead 237. The signals on these leads can thus be employed in conjunction with other signals further down the timing chain to develop timing signals for the overall monitoring unit. Each of the signals provided are one minute in length. The comparators 27 and 28 are connected in parallel with the exception that an inverter 241 interconnects a pair of actuation inputs so that only one of the comparators 27 or 28 can be operative at a single time. A flip-flop 239 which is set to an initial state upon actuation of the entire device initially selects the comparator 27 and disables the comparator 28.

Therefore, the comparator 27 connects one of the terminals 1 through 8 to the lead 275 in accordance with the digital signal on the leads 228, 229, and 230 corresponding to the message unit area which has been selected in accordance with the setting of the slide pot 10. The particular wiring of the memory unit 232 connects one of the leads 233 through 237 with each of the terminals 1 through 8 of the comparator 27. When a one minute pulse appears on the lead selected, it is passed by the comparator 27 to the lead 275 indicating, for that 1 minute, that the end of the initial time period is at hand. It should be clear that any time intervals can be selected and that the connection of the leads 233 through 237 to the counting chain 238 enables a wide variety of time selections in accordance with the various time intervals established by the telephone companies throughout the country.

At the end of the initial period, the flip-flop 239 is reset. The flip-flop 239 is reset by the trailing portion of the signal provided on the lead 275. This is accomplished by the output of the OR gate 233 on the lead 224 enabling an AND gate 31 to provide the pulsed signal from the lead 275. The output of the AND gate 31 feeds the OR gate 32 which is connected via lead 245 to an AND gate 247. The AND gate 247 is fed by a lead 248 connected to the counting chain 238 to provide a pulsed signal just before the end of each one minute interval. Therefore, the AND gate 247 passes a pulse via lead 249 to reset the flip-flop 239 just prior to the end of each one minute interval when an output is provided from the comparator 27 or 28. A slight delay is built into the flip-flop 239 to carry the reset past the one minute interval time. The output from the comparator 39 resets the flip-flop 239 in the same fashion as the outputs of comparator 27 or 28 when the slide pot 10 puts the unit in the intrastate mode. In the intrastate areas, the initial and overtime intervals are not determined by distance or zone as they are in the message unit areas but rather are determined by day, evening, or night usage. Therefore, two of the input leads indicated as $T_1$ and $R_1$ are connected via a switch 244 to a source of voltage for indicating to the unit whether the call is being made in the day, evening, or night time intervals. The actuation of the $T_1$ lead indicates day, the $R_1$ indicates evening, and no connection indicates night. The third input to the comparator 39 is connected to the flip-flop 239 indicating whether a selection for initial or overtime period is employed. The output of the comparator 39 is provided via lead 242 to an AND gate 40. To this end, the signal on the lead 242 passes through AND gate 40 when enabled by OR gate 226 to provide a signal via OR gate 32 and AND gate 247 to reset the flip-flop 239. The reason the AND gate 247 is needed is seen in the interstate mode where a DC signal is provided on lead 222 through OR gate 32 so that no pulse signal would be provided to reset the flip-flop 239. Under these circumstances, the timing signal from the counting chain 238 is employed to provide the pulse necessary to reset the flip-flop 239. Thus, it is seen that the flip-flop 239 distinguishes between the initial and overtime intervals for the message unit areas, the interstate areas, and the intrastate area calls.

Thus, it is seen that the state of the flip-flop 239 will indicate whether or not a call being made is in the initial or overtime interval for whatever type or zone of call the slide pot 10 selects. Thus, it is seen that for message unit area calls the comparator 27 determines the initial time interval. In the intrastate calls, the comparator 39 sets the initial interval while in interstate calls, the initial interval is always 1 minute and determined by the timing chain 238. Further, it is seen that signals are generated by the comparator 28 and the comparator 39 which are indicative of the overtime intervals for the message unit areas and the intrastate calls. Again, the overtime intervals for interstate calls are always one minute and are set by the timing chain 238. With the use of the selectively wirable hard wired memories 231, 232, and 243, the wide scope of initial and overtime timing intervals can be prewired into a particular unit varying in any fashion from message unit area to message unit area and from intrastate area to intrastate area.

C. RATE GENERATION FOR MESSAGE UNIT AREAS

In the message unit areas, the transition between one pay rate and another varies from message unit area to message unit area on a step function basis. In other words, there is an abrupt transition in rate at the edge of a message unit zone rather than a charge unit distance. Therefore, one need not know the distances from one place to another but only need know the number of message unit areas between the calling and called telephones. To this end, circuitry is employed in which a pair of transmission gates 41 and 42 are switched between the initial and incremental time intervals by signals on leads 252 and 253 to provide different rates for these time intervals. The gate 41 is closed during the initial interval while the gate 42 is closed during each subsequent incremental time interval.

It will be noted that a plurality of resistors 43 through 49 are connected as inputs in parallel to the gate 41. The other end of the gate 41, together with the other end of the gate 42, is connected to a negative feedback operational amplifier 51 for summing of the resistive inputs thereto. Therefore, when the gate 41 is closed and the gate 42 is opened, the resistors 43 through 49 are connected at the summing point of the amplifier 51 for summing purposes. The opposite ends of the resistors 43 through 49 are connected to the outputs of the comparators 11 through 17, respectively. In this way, a step function of current is provided by the resistors 43 through 49 when actuated by the respective comparators. The value of the resistors 43 through 49 are selected to conform with the rate structure and are additive since the comparators 11 through 17 are all on below the highest one actuated. Therefore, the digital information from the comparators 11 through 17 are converted to an analog signal at the output of the amplifier 51. In a like fashion during the overtime interval, the gate 41 is open and the gate 42 is closed, and the resistors 52, 53, and 54 are connected as inputs to the summing point of the operational amplifier 51. The opposite ends of the resistors 52 through 54 are connected to the comparators 12, 13, and 16, respectively. This is done since the rate structure is such that no additional message units are added in zone 1 during the incremental time interval. The incremental charges in the other time intervals vary in certain ones and not others, and therefore, the rate is only changed where a difference is encountered.

When the gate 41 is closed, the output of the operational amplifier 51 is a signal whose amplitude is indicative of the rate for the message unit area selected in the initial time interval. When the gate 42 is closed, the output of the operational amplifier 51 is a signal whose amplitude is indicative of the rate for the message unit area selected in the overtime interval. This rate signal is then operated upon by further circuitry to make modifications for taxes and day/night discounts. The output of the amplifier is fed through a switched voltage divider including the resistors 56 and 57 separated by a switch 58. When the normal day rate is to be applied, the switch 58 is open, and the signal from the output of the operational amplifier 51 is fed through resistor 56 thereby providing a rate signal. When either the evening or night discount, which are the same, is employed, the OR gate 59 is energized to operate switch 58 to divide down the signal by introducing the resistor 57 to ground in series with the resistor 56 at the output of the operational amplifier 51. The signal at the bottom end of the resistor 56 is fed through a switch 61 which is connected to the top of a tax rate potentiometer 62. The switch 61 is operated by the signal at the output of gate 223 which indicates that the unit is in the message unit area mode.

Thus, an analog signal appears at the arm 63 of the pot 62 which is indicative of the telephone charge during the initial time interval and, at a later time, the overtime rate during the overtime interval.

D. RATE GENERATION FOR INTERSTATE AND INTRASTATE AREAS

Attention should be brought back to the arm of the pot 10 which is brought to a pair of differential amplifiers 66 and 67. The differential amplifiers 66 and 67 are employed in this case as level shifters to return the portions of the pot 10 associated with either the intra or interstate back to a ground reference. In this way, an analog signal going from zero to a predetermined value can be employed for rate setting in each of these area modes without employing additional components such as additional potentiometers and the like. Therefore, the output of the differential amplifier 66 when the unit is in the intrastate area is a signal referenced to ground indicative of the distance between the caller and the called party in the same state. In a like fashion, the output of the differential amplifier 67 in the interstate mode provides a signal referenced to ground indicative of the distance between the calling and called parties in different states. These signals are employed in their respective modes to apply signals to the top of the tax surcharge potentiometer 62 similar to the signals applied in the message unit area. The reason the message unit area used step functions was that the rate structure in the message unit areas is discrete changes, whereas in intra and interstate, the changes are more continuous.

In the interstate mode, the circuitry labeled generally as 69 is interposed between the differential amplifier 67 and the potentiometer 62. The signal from the differential amplifier 67 is fed through a resistor 71 through a switch 72 to the potentiometer 62. The switch 72 is analogous to the switch 61 used in the message unit area and isolates the various rate circuits one from the other. The signal on lead 222 indicating the interstate mode closes the switch 72. A plurality of resistors 73 through 77 are employed to divide down the signal provided by the differential amplifier 67 in accordance with the proper rate structure. To this end, a decoder 78 receives signals indicating evening rate and night rate from switch 244, initial and incremental mode from flip-flop 239, and the fact that the unit is in the interstate mode from the lead 222. These signals are employed to drive logic circuitry 79 for grounding the appropriate resistor 73 through 77 to divide the signal for the appropriate rate structure.

For the intrastate mode, the same principals as discussed with regard to the message unit area and the interstate rates apply except that the tarrifs are substantially more complicated and that more complicated circuitry must be generated. To this end, the signal at the output of the operational amplifier 66 is fed to a network 81 which computes the intrastate discount rate. The signal from the operational amplifier 66 is selectively attentuated and/or offset in accordance with the rate structure depending upon the fact as to whether or not it is day, evening, or night or whether or not it is in the initial or the incremental mode. The rate structure is programmed into the intrastate generator 81 in four piece-wise linear line segments, the break points determined by differential amplifiers 18 through 21 in cooperation with the voltage divider chain 25 and the slide pot 10. The output signal from the unit 81 is supplied at 85 and from there to the top of the pot 62.

D. OUTPUT DISPLAY

The output from the arm 63 of the potentiometer 62 in any of the modes selected is applied as an input to a voltage controlled oscillator 95. The signal applied to the oscillator 95 is the fixed voltage generated by the pot 62. This signal is integrated in integrator 86 which is resettable by discharging the capacitor 87 by switch 88. The switch 88 is triggered each time the output of the integrator 86 exceeds a positive or negative limit. This is accomplished by a pair of differential amplifiers 89 and 91 which triggers a flip-flop 92, the output of which is fed back to the switch 88. Therefore, a signal is produced on the output 93 of the flip-flop 92 which has a frequency proportional to the signal provided on the arm 63 of the potentiometer 62. This signal is selectively gated into counters for the purpose of displaying the cost of the telephone call.

The initial charge for the call is loaded into a register 300 by a burst gating of the oscillator 95. This is accomplished by enabling the output of the oscillator 95 to drive the register 300 for an interval determined by the counter chain 238 during the fourth state of that counter on lead 301 the first time it is reached. This is accomplished by AND gate 302 and OR gate 304. Therefore, it is seen that by obtaining the analog signal to determine the frequency of the oscillator and bursting the output of the oscillator into the register 300 during the initial period a charge for the initial period can be displayed in display 303.

During the incremental mode, the output of the oscillator properly scaled is counted continuously in the register 300 so that the amount of money expended can be viewed on an increasing basis. This is accomplished by gate 305 driven by a signal from flip-flop 239 and inverter 241. In fact, the amount of money spent occurs at the beginning of each interval. It was felt however, that the psychological impact of the increasing cost would be a helpful feature in a consumer unit.

F. MODULATION OF DISPLAY

From the above, it is seen that the display provides an indication of the accumulated cost of a telephone call automatically both in the initial and incremental periods for message unit areas, interstate, or intrastate usage wherein the user merely sets the slide pot 10 to the zone or area being called and sets the switch 244 to the day, evening, or night state.

In order to further aid the consumer in saving costs of his telephone calls, provision is made to modulate the display prior to the end of each particular pay interval with the signal from gate 247 and lead 306. The modulation can, for example, start 18 seconds before the end of the interval and intensify 6 seconds before the end. The 18 second modulation can be a mild modulation while the 6 second modulation would give a more compelling indication to the user that the interval is about to end. For example, a low frequency modulation could be employed at 18 seconds while a higher frequency modulation could be employed at the 6 second rate. An alternative approach is to modulate a portion of the display such as a decimal point or the like at the 18 second time and to modulate the entire display including the numbers at the 6 second point. In this way, the user knows that if they continue talking, they are going to incur a further charge as a result of the continued use of the telephone. It should be noted that a further advantage of the above modulation is that the user knows that after the modulation is stopped, he might as well continue speaking until the modulation begins again since no further cost will be incurred for that usage of the telephone.

It should be understood that while this invention has been described with respect to a particular embodiment thereof numerous others will become obvious to those of ordinary skill in the art in light thereof.

What is claimed is:

1. An apparatus for calculating and displaying information relative to the cost of a telephone call while it is in progress including:
    means responsive to an adjustable signal applied thereto for providing a coded signal indicative of the relative locations of a calling party and a called party;

non-linear digital to analog converting means responsive to said coded signal for providing an analog signal;

a signal controlled oscillator responsive to said analog signal for providing a pulse train related to said analog signal;

means for counting said pulse train; and display means responsive to said counting means for displaying information relative to the cost of a telephone call while it is in progress.

2. The apparatus as defined in claim 1 in which said display means is responsive to said coded signal for providing a warning signal at a time determined by said coded signal.

3. The apparatus as defined in claim 1 in which an initial time interval signal is provided at the end of a time interval determined by said coded signal, and said non-linear digital to analog converting means is responsive to said initial time interval signal for providing a first non-linear digital to analog conversion prior to the occurrence of said initial time interval signal, and a second non-linear digital to analog conversion thereafter.

4. The apparatus as defined in claim 3 in which said display means is responsive to said coded signal for providing a warning signal at a time determined by said coded signal.

5. An apparatus for calculating and displaying information relative to the cost of a telephone call while it is in progress including:

a settable voltage divider for providing an analog divider signal in accordance with the setting thereof;

means responsive to said analog divider signal for providing a coded signal indicative of the relative locations of a calling party and a called party;

non-linear digital to analog converting means responsive to said coded signal for providing a converted analog signal;

a signal controlled oscillator responsive to signals applied thereto for providing a pulse train related to said signals applied thereto;

selection means responsive to said coded signal for applying either said analog divider signal or said converted analog signal to said signal controlled oscillator in accordance with the coded signal;

means for counting said pulse train; and display means responsive to said counting means for displaying information relative to the cost of a telephone call while it is in progress.

6. The apparatus as defined in claim 5 in which said display means is responsive to said coded signal for providing a warning signal at a time determined by said coded signal.

7. The apparatus as defined in claiam 5 in which an initial time interval signal is provided at the end of a time interval determined by said coded signal, and said non-linear digital to analog converting means is responsive to said initial time interval signal for providing a first non-linear digital to analog conversion prior to the occurrence of said initial time interval signal, and a second non-linear digital to analog conversion thereafter.

8. The apparatus as defined in claim 7 in which said display means is responsive to said coded signal for providing a warning signal at a time determined by said coded signal.

9. An apparatus for calculating and displaying information relative to the cost of a telephone call while it is in progress including:

a settable voltage divider for providing an analog divider signal in accordance with the setting thereof;

means responsive to said analog divider signal for providing a coded signal indicative of the relative locations of a calling party and a called party;

a signal controlled oscillator responsive to said analog divider signal for providing a pulse train related to said signals applied thereto;

means for counting said pulse train;

means responsive to said coded signal for providing a warning signal at a time determined by said coded signal; and display means responsive to said warning signal for displaying information relative to the cost of a telephone call while it is in progress.

10. The apparatus as defined in claim 9 also including:

means responsive to said coded signal for attenuating said analog divider signal to said signal controlled oscillator in response to said attentuated analog divider signal.

* * * * *

UNITED STATES PATENT AND TRADEMARK OFFICE
CERTIFICATE OF CORRECTION

PATENT NO. : 4,091,238
DATED : May 23, 1978
INVENTOR(S) : Ira Samuels, Metuchen; Sidney Barzman, Tenafly, both of New Jersey It is certified that error appears in the above-identified patent and that said Letters Patent are hereby corrected as shown below:

Column 2, line 19, after "signal" insert -- , a signal controlled oscillator responsive to the analog signal --

Column 3, line 22, after "pot" insert -- 10 --

Column 5, Line 53, after "charge" insert -- per --

Column 7, line 53, "D" should read -- E --

Signed and Sealed this

Tenth Day of October 1978

[SEAL]

Attest:

RUTH C. MASON
Attesting Officer

DONALD W. BANNER
Commissioner of Patents and Trademarks